(12) United States Patent
Muthukumar (10) Patent No.: US 7,316,012 B2
(45) Date of Patent: Jan. 1, 2008

(54) SYSTEM, METHOD, AND APPARATUS FOR SPILLING AND FILLING ROTATING REGISTERS IN SOFTWARE-PIPELINED LOOPS

(75) Inventor: Kalyan Muthukumar, Bagalore (IN)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 10/673,741

(22) Filed: Sep. 29, 2003

(65) Prior Publication Data

US 2005/0071607 A1    Mar. 31, 2005

(51) Int. Cl.
*G06F 9/44*    (2006.01)
(52) U.S. Cl. .................. 717/161; 717/150; 717/151; 717/160
(58) Field of Classification Search ............... 717/160, 717/161, 150, 151
See application file for complete search history.

(56) References Cited

U.S. PATENT DOCUMENTS

| | | | | |
|---|---|---|---|---|
| 6,131,144 A | * | 10/2000 | Koppala | 711/132 |
| 6,289,418 B1 | * | 9/2001 | Koppala | 711/132 |
| 6,651,247 B1 | * | 11/2003 | Srinivasan | 717/161 |
| 6,986,131 B2 | * | 1/2006 | Thompson et al. | 717/160 |
| 2003/0237080 A1 | * | 12/2003 | Thompson et al. | 717/161 |

* cited by examiner

Primary Examiner—Tuan Dam
Assistant Examiner—Isaac Tecklu
(74) Attorney, Agent, or Firm—Schwegman, Lundberg & Woessner, P.A.

(57) ABSTRACT

An efficient method for software-pipelining (SWP) of loops to translate programs, from higher level languages into equivalent object or machine language code for execution on a computer. In one example embodiment, this is accomplished by spilling and filling multiple computed values, in a register, that are live across multiple stages in a software-pipelined loop, using multiple rotating stack memory locations to reduce compiler-time of SWP, and complexity of the implemented SWP.

22 Claims, 7 Drawing Sheets

SYSTEM, METHOD, AND APPARATUS FOR SPILLING AND FILLING ROTATING REGISTERS IN SOFTWARE-PIPELINED LOOPS

TECHNICAL FIELD OF THE INVENTION

The present subject matter relates generally to compilers for computers and more particularly to software-pipelined loops.

BACKGROUND

Optimizing compilers are software systems for translation of programs from higher level languages into equivalent object or machine language code for execution on a computer. Optimization generally requires finding computationally efficient translations that reduce program runtime. Such optimizations may include improved loop handling, dead code elimination, software-pipelining, better register allocation, instruction prefetching, and/or reduction in communication cost associated with bringing data to the processor from memory.

Certain programs would be more useful if appropriate compiler optimizations are performed to decrease program runtime. A number of compilation techniques have been developed to improve the efficiency of loop computations by increasing instruction-level parallelism (ILP). One such method is software-pipelining (SWP), which improves the performance of a loop by overlapping the execution of several independent iterations. The number of cycles between the start of successive iterations in SWP is called the Initiation Interval (II), which is the greater of the resource II and the recurrence II. The resource II is based on the resource usage of the loop and the available processor resources. The recurrence II of the loop is based on the number of cycles in the dependence graph for the loop and the latencies of a processor. Maximum instruction level parallelism for the loop is realized if the recurrence II of the loop is less than or equal to its resource II.

A process architecture, such as an Intel® Itanium® architecture, may provide special features for SWP of loops, such as large sets of rotating registers, special branch, and other instructions that enable efficient SWP of loops. Rotating integer and floating-point registers enable SWP without the need to generate MOV instructions. A MOV instruction or operation is used to move values from one register to another register. Rotating predicate registers help in the generation of compact code for software-pipelined loops, without the need to generate explicit prologs and epologs for pipelined loops. Such SWP features can be useful to improve performance on applications that are loop-intensive.

However, in spite of these features and the large register sets for integer, floating-point, and predicates available in such processors, there are instances in which large loops may run out of rotating registers. In such situations, these loops don't get pipelined and the performance suffers. One possible solution to this problem is to change the schedule and increase the scheduled II. This can lead to a reduction in the number of required rotating registers and thus allows a successful allocation of rotating registers in such loops. A possible drawback is that it increases II, compile-time of SWP, and the complexity in implementation of SWP.

Another approach used to solve the above-described problem is to spill and fill rotating registers in software-pipelined loops. The traditional approach to spilling and filling non-rotating registers is to use unique memory locations for each register it is desired to spill and fill. The spilling and filling of non-rotating registers reduces the live ranges and register pressure thus enabling register allocation. Live range means a computation that is held in a register until it is needed. Unfortunately, this approach does not work for spilling and filling of rotating registers because the lifetimes of the rotating registers can be typically greater than II (lifetimes less than II are usually assigned to non-rotating registers). Accordingly, there is a need for an efficient spilling and filling of rotating registers in software-pipelined loops.

DETAILED DESCRIPTION OF THE INVENTION

The present subject matter provides novel apparatus, methods, and computer programs for spilling and filling of rotating registers in software-pipelined loops to reduce Initiation Interval (II), compile-time of software-pipelining (SWP), and/or complexity of implementation of SWP.

In the following detailed description of the embodiments of the subject matter, reference is made to the accompanying drawings that form a part hereof, and in which is shown, by way of illustration, specific embodiments in which the subject matter may be practiced. These embodiments are described in sufficient detail to enable those skilled in the art to practice the subject matter, and it is to be understood that other embodiments may be utilized, and that changes may be made without departing from the scope of the present subject matter. The following detailed description is, therefore, not to be taken in a limiting sense, and the scope of the present subject matter is defined only by the appended claims.

SWP is a compilation technique that improves the performance of a loop by overlapping the execution of several independent iterations. This improves the utilization of available hardware resources by increasing the instruction-level parallelism (ILP). The number of cycles between the start of successive iterations in a software-pipelined loop is called the II, which is the greater of the resource II and the recurrence II. The resource II is based on the resource usage of the loop and the processor resources available. The recurrence II is based on the cycles in the dependence graph for the loop and the latencies of the processor.

The terms "spilling" and "filling" of a register refers to storing values from that register in a memory location and retrieving values into that register from a memory location, respectively. Spilling and filling operations are generally hidden while executing a user program.

The following example illustrates the traditional approach of using a unique memory location to spill and fill a non-rotating register r10:

```
r10 =
...
   = r10
...
   = r10
```

The spill locations are on the stack memory and are usually some fixed offsets from the stack pointer sp. Assuming a stack location (sp+16) for spilling r10, the code after spilling and filling looks as follows:

```
r10 =
store [sp + 16] = r10
...
r10 = load [sp + 16]
   = r10
...
r10 = load [sp + 16]
   = r10
```

The spilling and filling reduces the live ranges for r10 and thereby reduces the register pressure on the above code. This enables register allocation for this code.

However, this approach does not work for spilling and filling of rotating registers that hold computed values that are live across multiple stages in a software-pipelined loop. This is because the lifetimes of the rotating registers typically are greater than II (lifetimes less than II are usually assigned to non-rotating registers). The following example code of a loop now illustrates the use of one traditional approach to spilling and filling a register when there are no rotating registers:

Loop:

```
...
(p16) f33 =                       // cycle 0
(p16) store [sp+16] = f33

(p17) f34 = load [sp+16]          // cycle 580
(p17)    = f34
...
(p17) f34 = load [sp+16]          // cycle 590
```

-continued

```
(p17)    = f34
...
br.ctop Loop                      // cycle 299 (II = 300)
```

In the above example, the lifetime of f33 is greater than II—it starts at cycle 0 and ends at cycle 590. Before the value that is stored in [sp+16] is used in the next kernel iteration, it is clobbered with the value of f33 from the next kernel iteration. Therefore, this traditional approach to spilling and filling generally does not work for rotating registers in software-pipelined loops, such as the one illustrated above.

Figure 1:
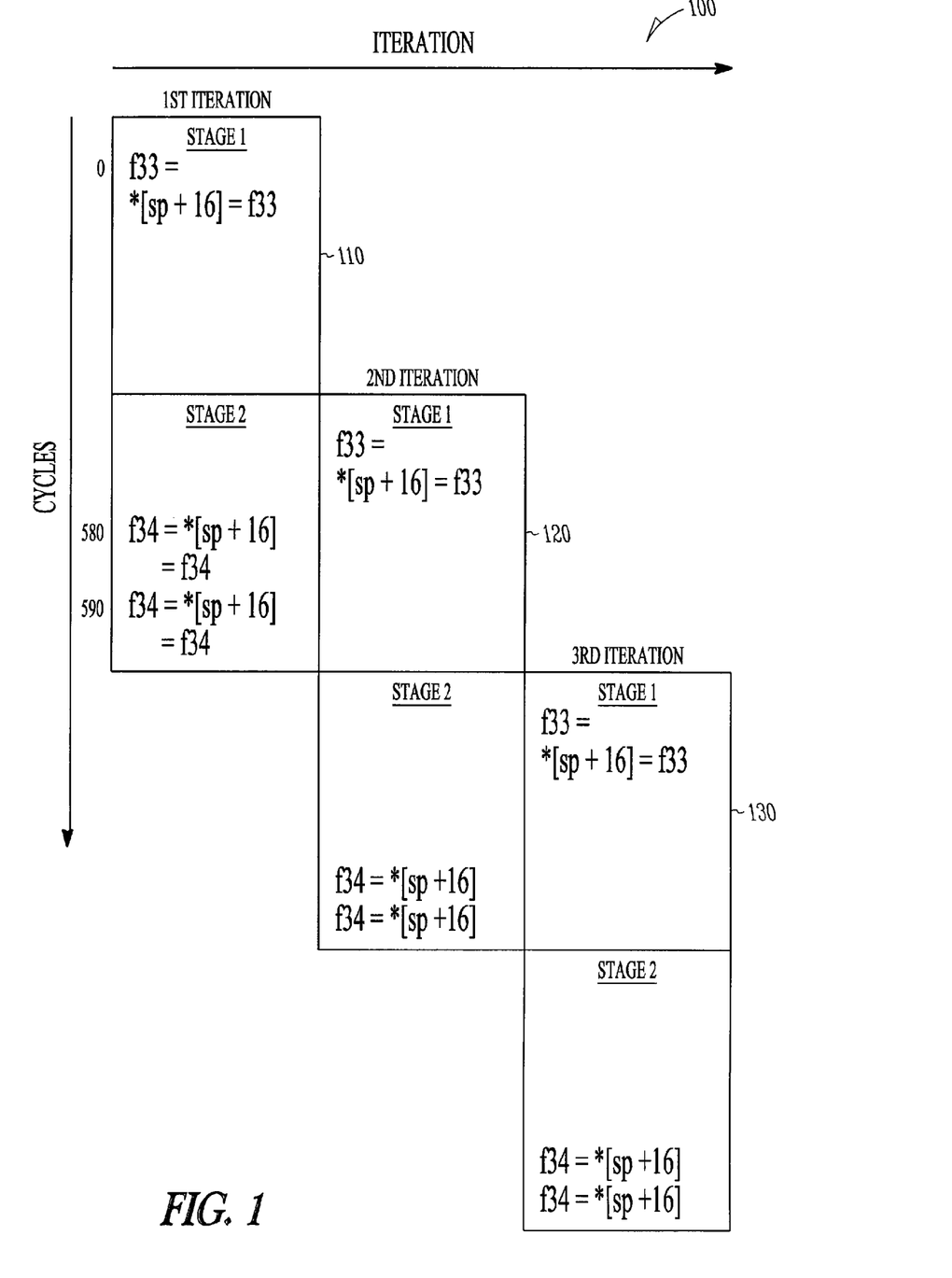
FIG. 1 is a block diagram illustrating an approach to spill and fill computed values, in a register, that are live across multiple stages in a software-pipelined loop.

The block diagram 100 in FIG. 1 graphically illustrates the problem (spilling and filling of a rotating register in a software-pipelined loop) with the above example. The graph in FIG. 1 shows iterations on the x-axis and stages/cycles on the y-axis. FIG. 1 illustrates an example two stage software-pipeline that provides a continuous overlap between subsequent iterations. The columns 110-130 show computations in iterations 1-3, respectively. It can be seen in FIG. 1 that the lifetime of f33 is greater than II (the number of cycles between the start of successive iterations in SWP is called the II), i.e., it starts at cycle 0 and ends at cycle 590 in the first iteration 110. As illustrated in FIG. 1, before the value that is stored in [sp+16] in stage 1 of the first iteration 110 is used in stage 2 of the same iteration 120, it is clobbered with the value of f33 in the next iteration 120. Therefore, the traditional approach to spilling and filling generally does not work for rotating registers in software-pipelined loops, such as the one illustrated above.

The following example of a loop according to one example embodiment of the present invention illustrates the use of multiple stack locations, for the same rotating register that is live across multiple stages in a software-pipelined loop, that overcomes the problem of spilling and filling rotating registers illustrated in the above example code and FIG. 1.

Loop:

```
...
(p16) f33 =                       // cycle 0
(p16) store [loc1] = f33

(p17) fyy = load [loc2]           // cycle 580
(p17)    = fyy
...
(p17) fzz = load [loc2]           // cycle 590
(p17)    = fzz
...
br.ctop Loop                      // cycle 299 (II = 300)
```

Let A=[sp+16], and B=[sp+32]. The stack location "loc1" is equal to A in the first iteration, B in the second iteration, A in the third iteration, and so on. So, it can be seen that the spilling location repeats as A, B, A, B, A, and so on. The stack location "loc2" is equal to B in the first iteration, A in the second iteration, B in the third iteration, and so on. So, it can be seen that the filling (loading) location repeats as B, A, B, A, B, and so on. The variables fyy and fzz are symbolic registers at cycles 580 and 590, respectively. The registers can be same or different.

The above example illustrates a stack alternating process, which can be viewed as "rotating" memory stack locations.

In the above example two memory stack locations A and B are rotated to solve the problem of spilling and filling of rotating register f33 illustrated in FIG. 1.

Figure 2:
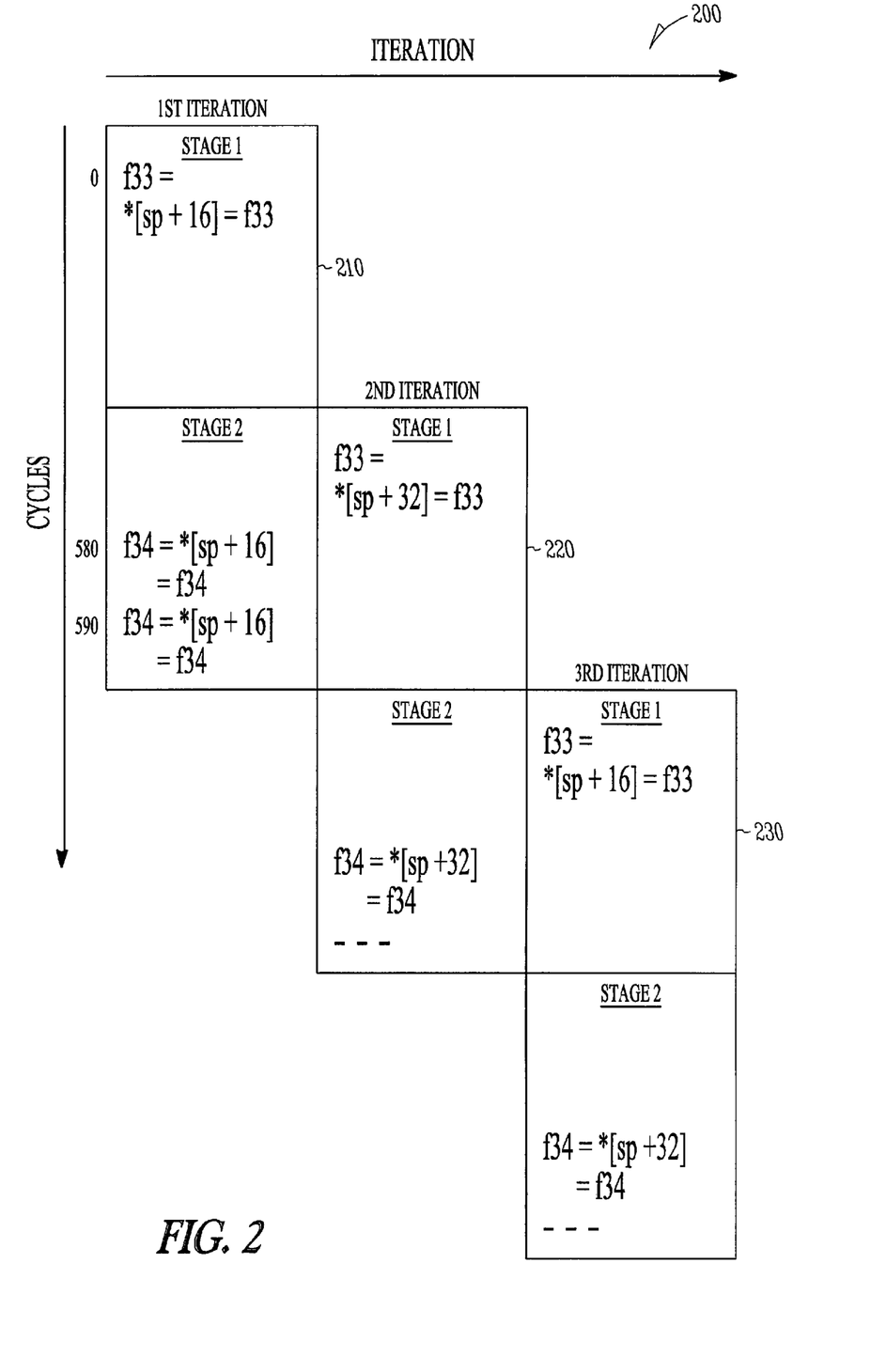
FIG. 2 is a block diagram illustrating a method of spilling and filling rotating registers in software-pipelined loops using rotating memory locations, in accordance with one embodiment of the present subject matter.

The block diagram 200 in FIG. 2 graphically illustrates the above example. The graph in FIG. 2 shows iterations on the x-axis and stages/cycles on the y-axis. FIG. 2 illustrates an example two stage software-pipeline that provides a continuous overlap between subsequent iterations. The columns 210-230 show computations in iterations 1-3, respectively. It can be seen in FIG. 2 that the lifetime of f33 is greater than II, i.e., it starts at cycle 0 and ends at cycle 590 in the first iteration 210. As illustrated in FIG. 2, computed value in f33 is stored in the alternating stack memory locations [sp+16] and [sp+32] to prevent the computed value stored in the stack location [sp+16] at cycle 0 in the first iteration 210 from being clobbered with the value of f33 in the next iteration 220.

Figure 3:
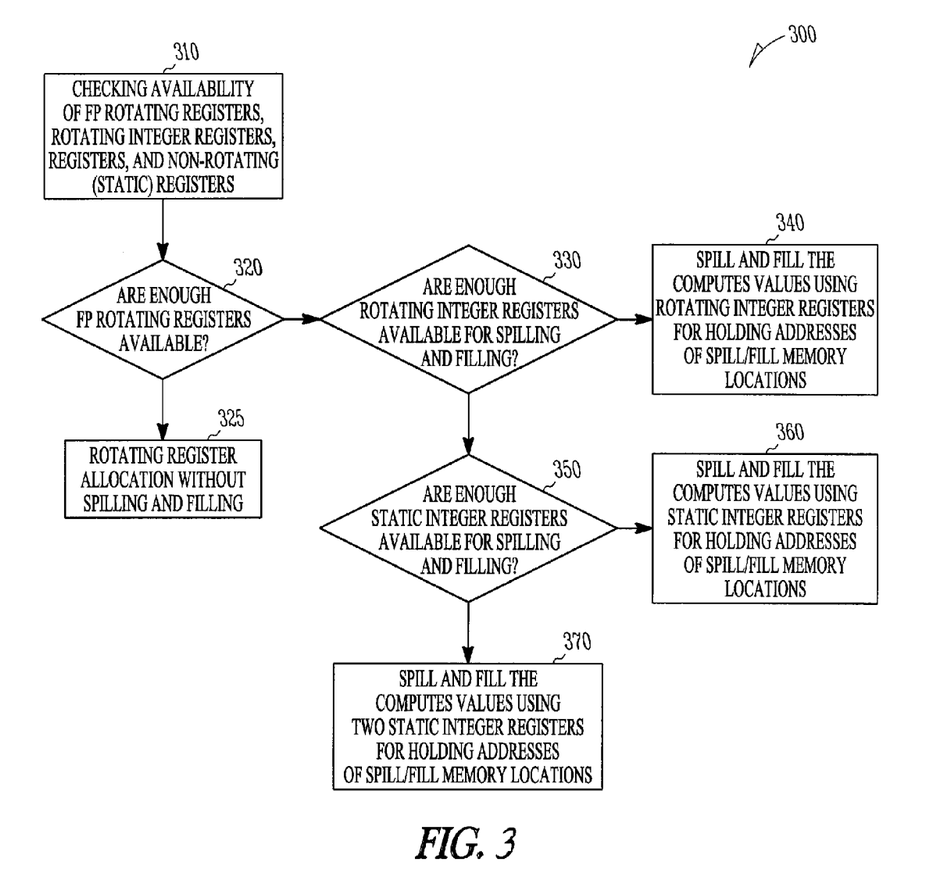
FIG. 3 is a flowchart illustrating a method and computer program for spilling and filling rotating registers in software-pipelined loops, in accordance with one embodiment of the present invention.

Referring now to FIG. 3, there is illustrated exemplary method 300, code for spilling and filling rotating registers in a software-pipelined loop. At 310, this example method 300 checks for availability of Floating Point (FP) rotating registers, integer rotating registers, and non-rotating (static) registers.

At 320, availability of FP rotating registers is checked based on the outcome of checking at 310. If the FP rotating registers are available, the computed values, in the FP register that are live across multiple stages in a software-pipelined loop, are allocated using the FP rotating registers at 325.

If the FP rotating registers are not available, then the availability of rotating integer registers for spilling and filling is checked at 330. If the rotating integer registers are available, the computed values in the FP registers that are live across the multiple stages in the software-pipelined loop are spilled and filled using the rotating integer registers for holding addresses of stack memory locations at 340.

If the rotating integer registers are not available, then the availability of static integer registers for spilling and filling is checked at 350. If the static registers are available, the computed values in the FP registers that are live across the multiple stages in the software-pipelined loop are spilled and filled using the static registers for holding addresses of stack memory locations at 360. If enough static registers are not available at 350, the computed values in the FP registers that are live across the multiple stages in the software-pipelined loop are spilled and filled using two static integer registers at 370.

Although the flowcharts 300 includes acts that are arranged serially in the exemplary embodiments, other embodiments of the subject matter may execute two or more acts in parallel, using multiple processors or a single processor organized as two or more virtual machines or sub-processors. Moreover, still other embodiments may implement the acts as two or more specific interconnected hardware modules with related control and data signals communicated between and through the modules, or as portions of an application-specific integrated circuit. Thus, the exemplary process flow diagram is applicable to software, firmware, and/or hardware implementations.

The following example of a loop illustrates using multiple rotating integer registers for holding spilling and filling locations, when the FP rotating registers are not available to hold the same value that is live across multiple stages in a software-pipelined loop. This overcomes the problem of spilling and filling rotating registers as illustrated in FIG. 1.

```
r36 = sp + 16      // r36 is a rotating register
r37 = sp + 32      // r37 is a rotating register
```

Loop:

```
...
(p16) f33 =                    // cycle 0
(p16) store [r36] = f33
...
(p17) fyy = load [r37]         // cycle 580
(p17)     = fyy
...
(p17) fzz = load [r37]         // cycle 590
(p17)     = fzz
...
r35 = r37                      // "rotate" the stack mem location
br.ctop Loop                   // cycle 299 (II = 300)
```

In the above example loop, f33 is stored at location [sp+16] in the first iteration. The register r36 then holds the value sp+16. In the second iteration, register r36 gets rotated to register r37 so that register r37 can hold the value sp+16. Then register r36 gets the value sp+32 due to the MOV instruction of r35=r37 at the end of the first iteration and register rotation. Therefore, the store of f33 in the second iteration does not clobber the value of f33 that was stored in the first iteration.

Figure 4:
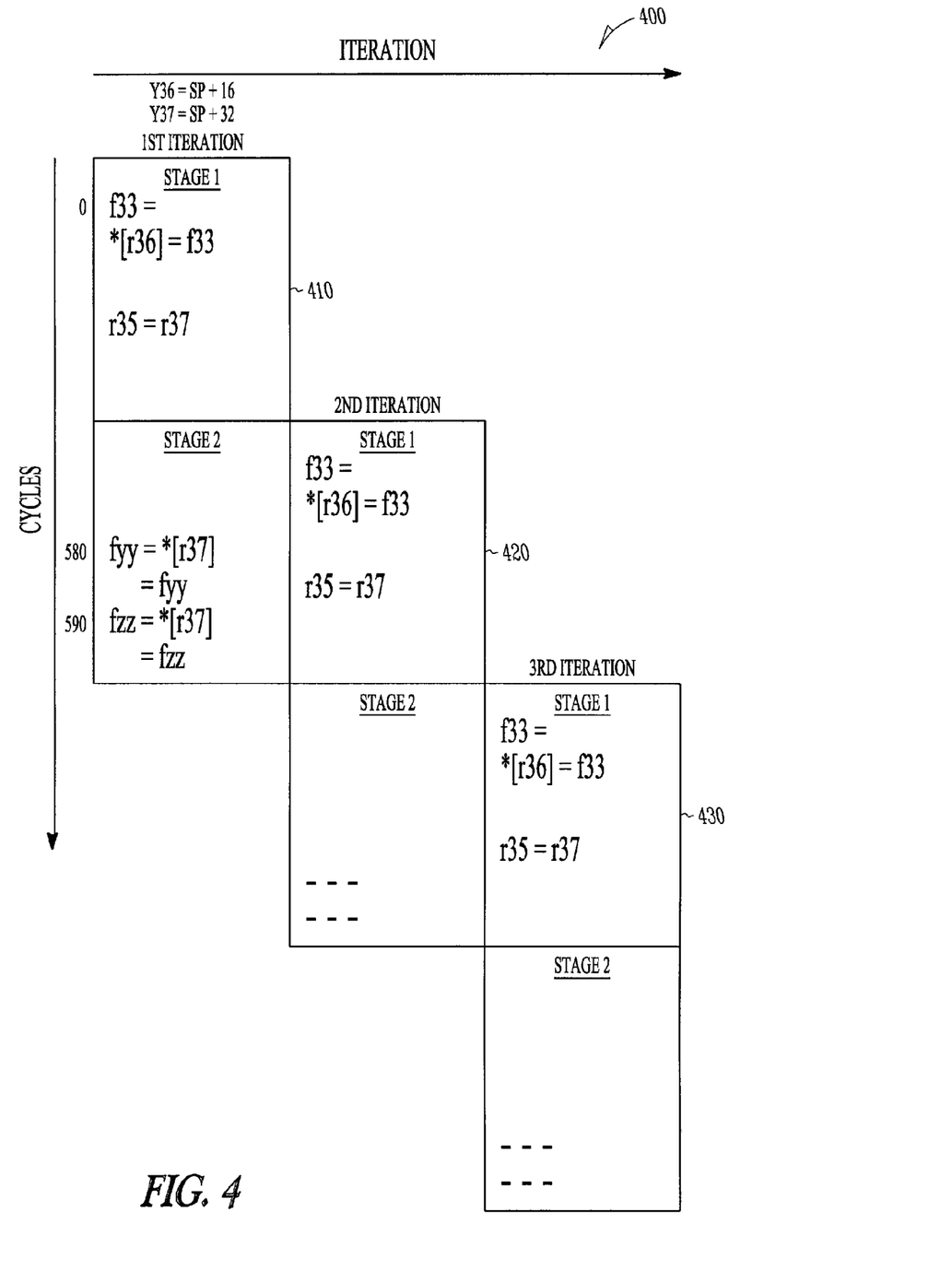
FIG. 4 is a block diagram illustrating a method of spilling and filling rotating registers in software-pipelined loops using rotating integer registers, in accordance with another embodiment of the present invention.

The block diagram 400 in FIG. 4 graphically illustrates the above example. The graph in FIG. 4 shows iterations on the x-axis and stages/cycles on the y-axis. FIG. 4 illustrates an example two stage software-pipeline that provides a continuous overlap between subsequent iterations. The columns 410-430 show computations in iterations 1-3, respectively. It can be seen in FIG. 4 that the lifetime of f33 is greater than II, i.e., it starts at cycle 0 and ends at cycle 590 in the first iteration 410. As illustrated in FIG. 4, f33 is stored at location [sp+16] in the first iteration 410. The register r36 holds the value sp+16. In the second iteration 420, register r36 gets rotated to register r37, and therefore register r37 holds the value sp+16. Then register r36 gets the value sp+32 due to the MOV instruction of r35=r37 at the end of the first iteration 410 and register rotation. Therefore, the store of f33 in the second iteration 420 does not clobber the value of f33 that was stored in the first iteration 410. Also it can be seen in FIG. 4, that the value of f33 stored in the first iteration 410 is the one that is loaded into the variables fyy and fzz in cycles 580 and 590 in the same iteration.

The above technique provides as many stack locations as there are simultaneous live values generated in a rotating register. This is done by using a least number of extra instructions inserted into the loop. It can be seen in the above example loop, that the only extra instruction, apart from the stores and the loads that are necessary to implement the spilling and filling, is the integer MOV instruction (that copies the value in register r37 into register r35). The integer MOV instruction makes sure that different live values are stored in different stack locations. The result being that the scheduled II of the loop after spilling and filling is minimally affected by the spilling and filling. In addition, in floating-point intensive loops, there are generally plenty of free integer slots available, and so the spilling and filling using the above technique does not increase II. The following algorithm outlines some of the principles of the embodiments of the above techniques described with reference to FIG. 4:

The algorithm uses integer rotating registers to hold the "rotating" stack memory locations to spill and fill computed values in software-pipelined loops. It is assumed that the live range of the register spilled is greater than II. It is also assumed that the FP rotating register whose values are spilled and filled spans N iterations (N=2 in the running example).

1. Check for availability of (N+1) contiguous integer rotating registers.
2. If (N+1) integer rotating registers are available, then assigning (N+1) contiguous registers as $r_1, r_2, \ldots, r_{(N+1)}$, respectively. In our running example the contiguous registers are r35, r36, and r37. These are consecutive rotating registers in ascending order.
3. Assigning the stack locations as $S_1, S_2, \ldots, S_N$, respectively. These stack locations do not have to be contiguous.
4. Adding the following MOV statements in the loop preheader:
   i. $r_2=S_1$
   ii. $r_3=S_2$
   iii. ....
   iv. $r_{(N+1)}=S_N$
5. Storing the FP register at the start of its live range at $[r_2]$. This store instruction is guarded by the same qualifying predicate register as the instruction that defines the FP register.
6. For each use of this FP register, an appropriate stack memory location is used for filling. For example, if the use occurs one stage after the definition then the fill is done from $[r_3]$, if it occurs two stages after the definition, then the fill is done from $[r_4]$, and so on. If the use occurs K stages after the definition, then the fill is done from $[r_{(K+2)}]$. The target registers for the fills could be any available FP registers. They can all be the same or be different. These registers have only small live ranges.
7. Adding the following MOV instruction at the bottom of the loop body and just before the br.ctop/br.wtop instruction:
   i. $r_1=r_{(N+1)}$ The following example of a loop according to one embodiment of the present subject matter illustrates another technique to overcome the problem of spilling and filling illustrated in FIG. 1. The following technique is used when there are not enough integer rotating registers available to hold addresses of "rotating" stack memory locations in a software-pipelined loop.

| | |
|---|---|
| r15 = sp + 32 | // spill location for iteration 2 |
| r16 = sp + 32 | // spill location for iteration 1 |
| r17 = sp + 48 | // overflow value for spill loc |

Loop:

| | |
|---|---|
| ... | |
| (p16) f33 = | // cycle 0 |
| (p16) store [r16] = f33, 16 ;; | // post-incremented store |
| (p16) cmp.eq.unc p25 = r16, r17 | |
| (p25) r16 = sp+ 16 | // "reset" stack loc if > sp+32 |

-continued

| | |
|---|---|
| ... | |
| (p17) fyy = load [r15] | // cycle 580 |
| (p17) = fyy | |
| ... | |
| (p17) fzz = load [r15], 16 | // cycle 590; post-incremented load |
| (p17) = fzz | |
| (p17) cmp.eq.unc p25 = r15, r17 | |
| (p25) r15 = sp + 16 | // "reset" stack loc if > sp+32 |
| ... | |
| br.ctop Loop | // cycle 299 (II = 300) |

In the above example loop, f33 is stored in stack location [sp+32] during the first iteration. Then the register r16, which holds the value of the stack location sp+32, is post-incremented to sp+48. Since only 2 stack locations are needed to hold the values of f33 generated in two consecutive iterations, register r16 is "reset" to sp+16. In the second iteration, f33 is stored in stack location [sp+16]. Similarly, the registers fyy and fzz are loaded from stack locations [sp+32] during the second stage of the first iteration and register r15, which holds the value of the stack location after one rotation, is post-incremented. If necessary, this register is also "reset" to sp+16.

Note that later iterations use stack location addresses that are smaller than the tack location addresses used in earlier iterations. This is generally not required in the above example in which the spilled live range spans only 2 iterations. However, this may be required where the spilled live range spans more iterations.

Note also that both the registers r15 and r16 are initialized to sp+32 outside the above example loop. This is because only register r16 gets post-incremented in the first iteration (p16=True). In the second iteration, both registers r15 and r16 get post-incremented, and so on.

The above technique requires more instructions than the previous technique described with reference to FIG. 4. However, this technique does not require integer rotating registers. It uses non-rotating registers. So, the above method can be used when there are not enough integer registers available in the loop to hold the stack locations for spilling and filling.

This method requires (N+1) non-rotating registers for each live range that spans across N iterations. In the above example loop, 3 non-rotating registers are needed because f33 is live across 2 iterations.

Figure 5:
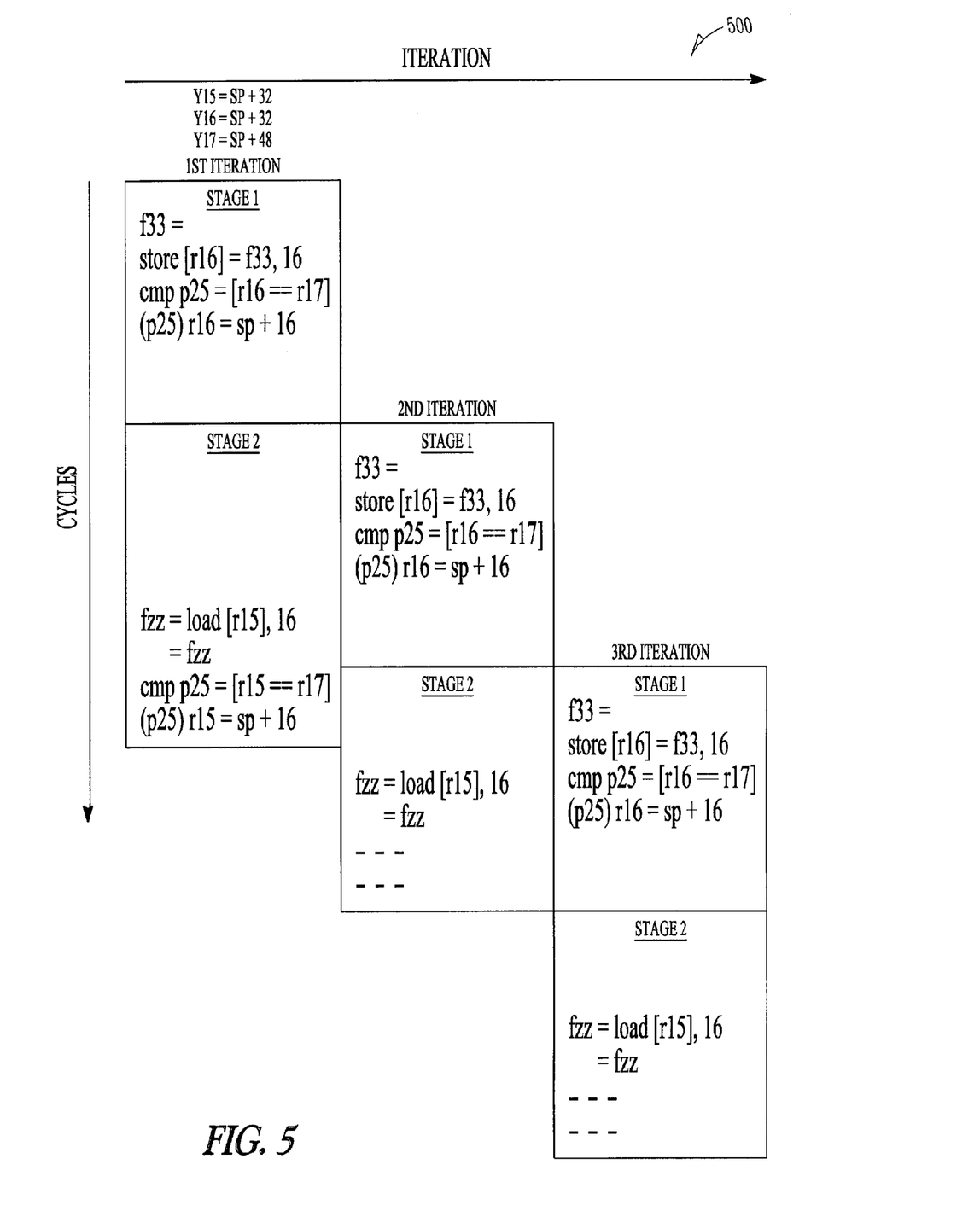
FIG. 5 is a block diagram illustrating a method of spilling and filling rotating registers in software-pipelined loops using non-rotating integer registers, in accordance with another embodiment of the present invention.

The block diagram 500 in FIG. 5 graphically illustrates the above example. The graph in FIG. 5 shows iterations on the x-axis and stages/cycles on the y-axis. FIG. 5 illustrates an example two stage software-pipeline that provides a continuous overlap between subsequent iterations. The columns 510-530 show computations in iterations 1-3, respectively. It can be seen in FIG. 5 that the lifetime of f33 is greater than II, i.e., it starts at cycle 0 and ends at cycle 590 in the first iteration 510. As illustrated in FIG. 5, f33 is stored in stack location [sp+32] during the first iteration 510. Then the register r16, which holds the value sp+32, is post-incremented to sp+48. Since only 2 stack locations are needed to hold the values of f33 generated in two consecutive iterations, register r16 is now "reset" to sp+16. In the second iteration 520, f33 is stored in stack location [sp+16]. Similarly, the registers fyy and fzz are loaded from stack locations [sp+16] in the second stage of the first iteration 510 and register r15, which holds the value of the stack location after one rotation, is post-incremented. Also it can be seen in FIG. 5, that the value of f33 stored in the first iteration 510 in cycle 0 is the one that is loaded into the variables fyy and fzz in cycles 580 and 590 in the second stage of the first iteration 510. The following algorithm outlines some of the principles of the embodiments of the above techniques described with reference to FIG. 5:

The algorithm uses non-rotating integer registers to hold addresses of "rotating" stack register locations when there are not enough rotating integer registers available to hold them. It is assumed that the FP rotating register whose values are spilled and filled spans N iterations (N=2 in the running example).

1. Check for availability of (N+1) non-rotating integer registers to hold the "rotating" stack memory locations.
2. If (N+1) non-rotating integer registers are available, then assigning (N+1) non-rotating integer registers as $r_1, r_2, \ldots, r_{(N+1)}$, respectively. In our running example the non-rotating integer registers are r15, r16, and r17. These registers do not have to be consecutive, even though the running example illustrates consecutive registers. Basically, one register from this set is used to hold the address of the spill/fill location for each stage of the pipeline in which the FP register is referenced. The final register is used to hold the "overflow" value for the address of the stack location.
3. Assigning the stack locations as $S_1, S_2, \ldots, S_M$, respectively, when the FP rotating register whose values are spilled and filled spans M iterations (M>=N). These stack locations have to be contiguous and in descending order. Consecutive stack locations are separated by 16 bytes.
4. Adding the following MOV statements in the loop preheader:
   $r_1 = S_1$
   $r_2 = S_1$
   . . .
   $r_N = S_1$
   $r_{(N+1)} = S_1 + 16$
5. Same non-rotating integer register is used to hold the address of the spill location for each reference of the spilled register in a given stage of the software-pipeline. At the last stage spill/fill operation for a given stage, the memory operation is post-incremented.
6. The addresses are compared with ($S_1$+16) after post-incrementing. If the addresses are equal, then it is reset to $S_M$.
7. Steps 5 and 6 are repeated for each of the non-rotating integer registers $r_1, r_2, \ldots, r_N$.

The following example of a loop according to one example embodiment of the present subject matter illustrates yet another technique to overcome the problem of spilling and filling illustrated in FIG. 1. The following technique is used when there are not enough integer rotating registers and non-rotating registers, as required by the previous two techniques, available to hold addresses of "rotating" stack memory locations in a software-pipelined loop. The above technique is similar to the previous technique except that this uses only 2 non-rotating integer registers per spilled live range.

| | |
|---|---|
| r15 = sp + 32 | // "greatest" spill location |
| r16 = sp + 48 | // overflow value for spill loc |

Loop:

| | |
|---|---|
| ... | |
| (p16) f33 = | // cycle 0 |
| (p16) store [r15] = f33, 16 ;; | // post-incremented store |
| (p16) cmp.eq.unc p25 = r15, r16 | |
| (p25) r15 = sp+ 16 | // "reset" stack loc if > sp+32 |
| ... | |
| (p17) fyy = load [r15] | // cycle 580 |
| (p17)      = fyy | |
| ... | |
| (p17) fzz = load [r15] | // cycle 590 |
| (p17)      = fzz | |
| ... | |
| br.ctop Loop | // cycle 299 (II = 300) |

The above example loop uses only one non-rotating register to hold the values of the different spill locations that contain the different instances of the value of a live range. In the first kernel iteration, register r15 has the value of sp+32 when f33 is stored. However, the registers fyy and fzz are loaded from [sp+16] because they are executed in one kernel iteration that is later than when the value of f33 is produced and the values needed are at [sp+16].

Figure 6:
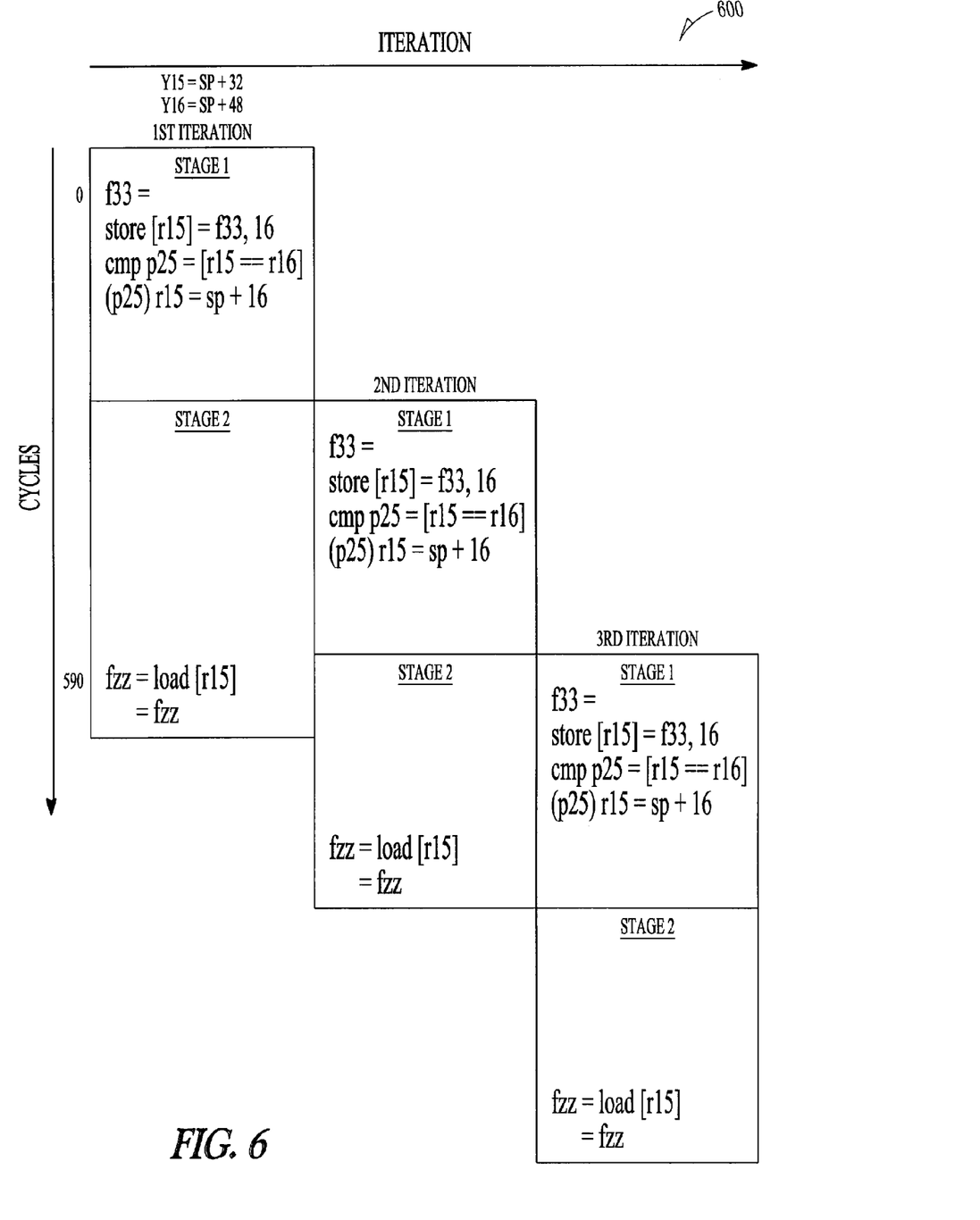
FIG. 6 is a block diagram illustrating a method of spilling and filling rotating registers in software-pipelined loops using only two non-rotating integer registers, in accordance with another embodiment of the present invention.

The block diagram 600 in FIG. 6 graphically illustrates the above example. The graph in FIG. 6 shows iterations on the x-axis and stages/cycles on the y-axis. FIG. 6 illustrates an example two stage software-pipeline that provides a continuous overlap between subsequent iterations. The columns 610-630 show computations in iterations 1-3, respectively. It can be seen in FIG. 6 that the lifetime of f33 is greater than II, i.e., it starts at cycle 0 and ends at cycle 590 in the first iteration 610. As illustrated in FIG. 6, the above example loop uses only one non-rotating register to hold the values of different spill locations that contain different instances of the value of a live range. In the first iteration 610, register r15 has the value of sp+32 when f33 is stored. However, the registers fyy and fzz are loaded from [sp+16] because they are executed in one kernel iteration that is later than when the value of f33 is produced and the values needed are at [sp+16]. Also it can be seen in FIG. 6, that the value of f33 stored in the first iteration 610 in cycle 0 is the one that is loaded into the variables fyy and fzz in cycles 580 and 590 in the second stage of the first iteration 610.

In the above example loop, only one post-incremented memory operation is needed. However, in general, if there are M different places in the loop where the live range is spilled and filled, as many as M post-incremented memory operations may be needed.

The advantage of this technique over the previous technique is that it requires fewer non-rotating integer registers to hold the addresses of the spill locations. The above technique requires only 2 such registers for each live range, regardless of the number of iterations that it spans. The disadvantage is that it may require a higher II for a loop that doesn't have the empty memory slots at the right locations in the pipelined loop. This is because the same non-rotating integer register is used to hold the addresses of the memory locations for different kernel iterations. Hence the spill and fill operations need to happen in the right sequence and at the right places. If empty memory slots are not available at these locations, then this technique cannot be applied without introducing additional bundles, and therefore can increase the scheduled II. The following algorithm outlines some of the principles of the embodiments of the above techniques described with reference to FIG. 6:

The algorithm uses non-rotating integer registers to hold the "rotating" stack memory locations when there is not enough number of integer rotating or non-rotating registers available to spill and fill as required by above techniques described with reference to FIGS. 4 and 5. This algorithm is similar to the above technique described with reference to FIG. 5, except that it only uses 2 non-rotating integer registers per spilled live range. It is assumed that the live range of the register spilled is greater than II. It is also assumed that the FP rotating register whose values are spilled and filled spans N iterations (N=2 in the running example).

1. Check for availability of 2 non-rotating integer registers.
2. If 2 non-rotating integer registers are available, then assigning the 2 non-rotating integer registers as $r_{k1}$ and $r_{k2}$. These non-rotating integer registers do not have to be consecutive non-rotating integer registers. Non-rotating integer register $r_{k1}$ is used to hold the addresses for the different spilled locations for the different stages. Non-rotating integer register $r_{k2}$ is used to hold the address of the "overflow" stack location. This is used in the cmp instructions.
3. Assigning the stack locations as $S_1, S_2, \ldots, S_M$, respectively, when the FP rotating register whose values are spilled and filled spans M iterations (M>=N). These stack locations have to be contiguous and in descending order. Consecutive stack locations are separated by 16 bytes.
4. Adding the following MOV statements in the loop preheader:
   i. $r_{k1}=S_1$
   ii. $r_{k2}=S_1+16$
5. Same non-rotating integer register is used to hold the address of the spill location for each reference of the spilled register in all stages of the software-pipeline. However, it actually contains different values depending upon the stage in which it is executed. The correctness of those values is ensured by proper post-incrementing.
6. The post-incrementing is done as follows: Two spill/fill instances in the kernel code are considered that are "next" to each other in the code sequence, i.e., no other spill/fill instance occurs in between them. If the instance that occurs "next" in the kernel code sequence is executed K iterations later (K could be positive or negative—negative implies that the next instance is executed (–K) iterations earlier). Then the post-increment on the memory instruction (spill/fill) for the current instance is (–K·16). If this value does not fit into the post-increment field of the sill/fill, then a separate add instruction has to be added to the loop after the spill/fill instruction.
7. After each post-incrementing operation, if it is an addition, then the address is compared with ($S_1$+16) and if the post-incrementing operation is a subtraction, then the address is compared with ($S_M$–16). If the result of the equality comparisons is true, in the former case, it is reset to $S_M$, and in the latter case, it is reset to $S_1$.

The above-described techniques provide efficient methods for spilling and filling computed values, in a register, that are live across multiple stages in software-pipelined loops. Compared to the traditional techniques which handle SWP loops where there are insufficient rotating registers, the above techniques can reduce II, compiler-time of SWP, and complexity of the implemented SWP as described-above. The above methods exploit features, such as predication, rotating registers, and special branches for SWP, provided in a processor architecture, such as the Intel® Itanium® processor family architecture.

Various embodiments of the present subject matter can be implemented in software, which may be run in the environment shown in FIG. 7 (to be described below) or in any other suitable computing environment. The present subject matter is operable in a number of general-purpose or special-purpose computing environments. Some computing environments include personal computers, general-purpose computers, server computers, hand-held devices (including, but not limited to, telephones and personal digital assistants of all types), laptop devices, multi-processors, microprocessors, set-top boxes, programmable consumer electronics, network computers, minicomputers, mainframe computers, distributed computing environments and the like to execute code stored on a computer-readable medium. The present subject matter may be implemented in part or in whole as machine-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 7:
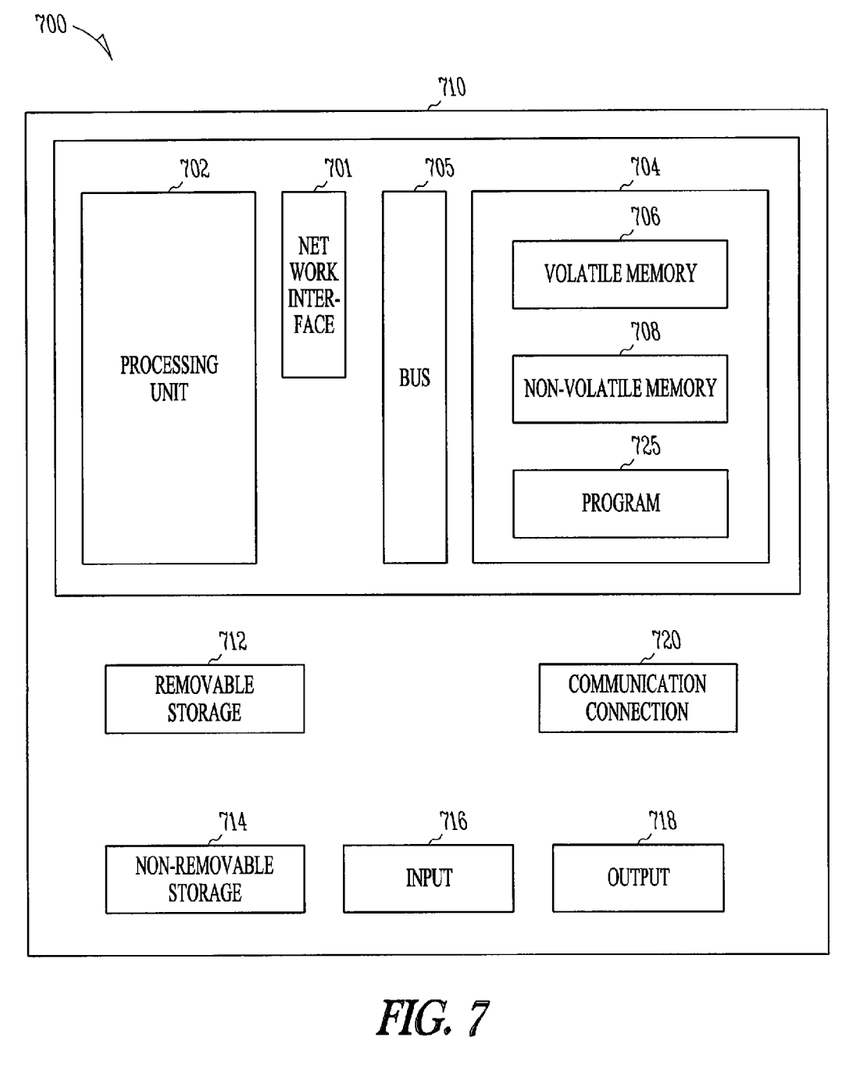
FIG. 7 is an example of a suitable computing environment for implementing embodiments of the present invention.

FIG. 7 shows an example of a suitable computing system environment for implementing embodiments of the present subject matter. FIG. 7 and the following discussion are intended to provide a brief, general description of a suitable computing environment in which certain embodiments of the inventive concepts contained herein may be implemented.

A general computing device, in the form of a computer 710, may include a processing unit 702, memory 704, removable storage 712, and non-removable storage 714. Computer 710 additionally includes a bus 705 and a network interface (NI) 701.

Computer 710 may include or have access to a computing environment that includes one or more input elements 716, one or more output elements 718, and one or more communication connections 720. The computer 710 may operate in a networked environment using the communication connection 720 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 704 may include volatile memory 706 and non-volatile memory 708. A variety of computer-readable media may be stored in and accessed from the memory elements of computer 710, such as volatile memory 706 and non-volatile memory 708, removable storage 712 and non-removable storage 714.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM); hard drive; removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit", as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, Explicitly parallel Instruction Computing (EPIC) microprocessor, a graphics processor, a digital signal processor, or any other type of processor or processing circuit. The term also includes embedded controllers, such as Generic or Programmable Logic Devices or Arrays, Application Specific Integrated Circuits, single-chip computers, smart cards, and the like.

Embodiments of the subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 702 of the computer 710. For example, a computer program 725 may comprise machine-readable instructions capable of spilling and filling of rotating registers in software-pipelined loops according to the teachings of the present subject matter. In one embodiment, the computer program 725 may be included on a CD-ROM and loaded from the CD-ROM to a hard drive in non-volatile memory 708. The machine-readable instructions cause the computer 710 to spill and fill a register, that are live across multiple stages in a software-pipelined loop according to the present subject matter.

The various embodiments of the compilers and methods for efficient spilling and filling of rotating registers in software-pipelined loops are applicable generically to any computationally efficient translations that reduce program runtime, and the embodiments described herein are in no way meant to limit the applicability of the subject matter. In addition, the techniques of the various example embodiments are useful for translation of programs from higher level languages into equivalent object or machine language code, any hardware implementations of translation of programs, software, firmware and algorithms. Accordingly, the methods and apparatus of the subject matter are applicable to such applications and are in no way limited to the embodiments described herein.

Further, as described-above, various example embodiments of the subject matter provide for reducing the II in large loops to optimize translation of programs and reduce run time. In addition, the above-described embodiments reduce compile-time of SWP and the complexity of the implementation of SWP.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

The invention claimed is:

1. A method of software pipelining for improving efficiency of loop handling, the method comprising:
   checking for availability of rotating registers to hold computed values that are live across multiple stages in a software-pipelined loop; and
   spilling and filling the computed values held in rotating registers in a software-pipelined loop using rotating stack memory locations for rotating registers, when there are no rotating registers available to hold the computed values, wherein the number of the rotating stack memory locations used for spilling and filling the computed values equals the number of simultaneous live values generated by the rotating register.

2. The method of claim 1, wherein the computed values are Floating Point (FP) values.

3. The method of claim 1, wherein the rotating registers are FP rotating registers.

4. A method of software pipelining for improving efficiency of loop handling, the method comprising:
   checking for availability of FP rotating registers to hold FP computed values that are live across multiple stages in a software-pipelined loop; and
   spilling and filling the computed values using rotating integer registers for holding addresses of stack memory locations when there are no FP rotating registers available to hold the computed value, the spilling and filling the computed values comprising:
      checking for availability of N+1 rotating integer registers, wherein N is number of stages a computed value that needs to be spilled is live in the software-pipelined loop; and
      spilling and filling the computed value in stack memory locations whose addresses are held in corresponding N+1 rotating integer registers, when the N+1 rotating integer registers are available.

5. The method of claim 4, wherein spilling and filling the computed value comprises:
   storing the computed value in the stack memory locations whose addresses are held in corresponding N+1 rotating integer registers; and
   loading from the stack memory locations whose addresses are held in corresponding N+1 rotating integer registers based on number of stages between when the loading occurs from the storing of the corresponding computed value.

6. The method of claim 4, wherein target registers for filling could be any available FP registers.

7. A method of software pipelining for improving efficiency of loop handling, the method comprising:
- using post-incremented memory operations for spilling and filling of live computed values, held in a FP rotating register, that are live across multiple stages in a software-pipelined loop, using non-rotating registers, when there are no rotating integer registers available to hold rotating stack memory locations,
- checking for availability of N+1 non-rotating integer registers available for spilling and filling, wherein N is a number of stages a computed value that needs to be spilled is live in the software-pipelined loop; and
- spilling and filling the computed values in stack memory locations whose addresses are held in corresponding N+1 non-rotating integer registers, when the N+1 non-rotating registers are available.

8. The method of claim 7, wherein using the non-rotating registers comprises:
- using the non-rotating integer registers.

9. A method of software pipelining for improving efficiency of loop handling, the method comprising spilling and filling of live computed values, held in a rotating register, that are live across multiple stages in a software-pipelined loop, using two non-rotating integer registers, when there are no FP rotating registers available and when there are no rotating integer registers available for holding rotating stack memory locations, and when there are not enough non-rotating integer registers available for holding rotating stack memory locations.

10. The method of claim 9, wherein the two non-rotating registers do not have to be contiguous.

11. The method of claim 9, wherein the rotating stack memory locations have to be contiguous and in descending order.

12. A method of software pipelining for improving efficiency of loop handling, the method comprising:
- checking for availability of rotating integer registers and non-rotating integer registers, to spill and fill computed values held in a FP rotating register, that are live across multiple stages in a software-pipelined loop;
- spilling and filling the computed values, held in a FP rotating register, using the rotating integer registers to hold rotating stack memory locations, when there are no FP rotating registers available to hold the computed values;
- spilling and filling the computed values, held in the FP rotating register, using non-rotating registers to hold the rotating stack memory locations, when there are no FP rotating registers to hold the computed values and further when there are no rotating integer registers available for holding rotating stack memory locations; and
- spilling and filling the computed values held in the FP rotating register, using two non-rotating integer registers to hold the rotating stack memory locations, when there are no FP rotating registers to hold the computed values, where there are no rotating integer registers available, and further when there are only a few non-rotating integer registers available for holding rotating stack memory locations.

13. The method of claim 12, wherein spilling and filling the computed values using the rotating integer registers comprises:
- checking for availability of N+1 rotating integer registers, wherein N is number of stages a computed value that needs to be spilled is live in the software-pipelined loop; and
- spilling and filling the computed values in stack memory locations whose addresses are held in corresponding N+1 rotating integer registers, when the N+1 rotating integer registers are available.

14. The method of claim 12, wherein spilling and filling the computed values using non-rotating integer registers comprises:
- checking for availability of N+1 non-rotating integer registers available for spilling and filling, wherein N is a number of stages a computed value that needs to be spilled is live in the software-pipelined loop; and
- spilling and filling the computed values in stack memory locations whose addresses are held in corresponding N+1 non-rotating integer registers, when the N+1 non-rotating registers are available.

15. The method of claim 12, wherein the two non-rotating registers do not have to be contiguous.

16. The method of claim 12, wherein the rotating stack memory locations have to be contiguous and in descending order.

17. An article comprising a computer-readable medium which stores computer-executable instructions, the instructions causing the computer to perform:
- checking for availability of rotating integer registers and non-rotating integer registers, to spill and fill computed values held in a FP rotating register, that are live across multiple stages in a software-pipelined loop;
- spilling and filling the computed values, held in a FP rotating register, using the rotating integer registers to hold the rotating stack memory locations, when there are no FP rotating registers available to hold the computed values;
- spilling and filling the computed values, held in the FP rotating register, using the non-rotating registers to hold the rotating stack memory locations, when there are no FP rotating registers to hold the computed values and further when there are no rotating integer registers available for holding rotating stack memory locations; and
- spilling and filling the computed values held in the FP rotating register, using two non-rotating integer registers to hold the rotating stack memory locations, when there are no FP rotating registers to hold the computed values, where there are no rotating integer registers available, and further when there are only a few non-rotating integer registers available for holding rotating stack memory locations.

18. The article comprising a computer-readable medium which stores computer-executable instructions of claim 17, wherein spilling and filling the computed values using the rotating integer registers comprises:
- checking for availability of N+1 rotating integer registers, wherein N is number of stages a computed values that needs to be spilled is live in the software-pipelined loop; and
- spilling and filling the computed values in stack memory locations whose addresses are held in corresponding N+1 rotating integer registers, when the N+1 rotating integer registers are available.

19. The article comprising a computer-readable medium which stores computer-executable instructions of claim 17, wherein spilling and filling the computed values using non-rotating integer registers comprises:

checking for availability of N+1 non-rotating integer registers available for spilling and filling, wherein N is a number of stages a computed value that needs to be spilled is live in the software-pipelined loop; and spilling and filling the computed values in stack memory locations whose addresses are held in corresponding N+1 non-rotating integer registers, when the N+1 non-rotating registers are available.

20. A system comprising:

a bus;

a processor coupled to the bus;

a memory coupled to the processor; and a network interface coupled to the processor and the memory, wherein the processor to spill and fill multiple computed values, in a register, that are live across multiple stages in a software-pipelined loop, by performing:

checking for availability of rotating integer registers and non-rotating integer registers, to spill and fill computed values held in a FP rotating register, that are live across multiple stages in a software-pipelined loop;

spilling and filling the computed values, held in a FP rotating register, using the rotating integer registers to hold rotating stack memory locations, when there are no FP rotating registers available to hold the computed values;

spilling and filling the computed values, held in the FP rotating register, using the non-rotating registers to hold the rotating stack memory locations, when there are no FP rotating registers to hold the computed values and further when there are no rotating integer registers available for holding rotating stack memory locations; and spilling and filling the computed values held in the FP rotating register, using two non-rotating integer registers to hold the rotating stack memory locations, when there are no FP rotating registers to hold the computed values, where there are no rotating integer registers available, and further when there are only a few non-rotating integer registers available for holding rotating stack memory locations.

21. The system of claim 20, wherein the processor checks for availability of N+1 rotating integer registers, wherein N is number of stages a computed value that needs to be spilled is live in the software-pipelined loop, and spills and fills the computed values in stack memory locations whose addresses are held in corresponding N+1 rotating integer registers, when the N+1 rotating integer registers are available.

22. The system of claim 20, wherein the processor checks for availability of N+1 non-rotating integer registers available for spilling and filling, wherein N is a number of stages a computed value that needs to be spilled is live in the software-pipelined loop, and spills and fills the computed values in stack memory locations whose addresses are held in corresponding N+1 non-rotating integer registers, when the N+1 non-rotating registers are available.

* * * * *

UNITED STATES PATENT AND TRADEMARK OFFICE
CERTIFICATE OF CORRECTION

| | |
|---|---|
| PATENT NO. | : 7,316,012 B2 |
| APPLICATION NO. | : 10/673741 |
| DATED | : January 1, 2008 |
| INVENTOR(S) | : Muthukumar |

Page 1 of 1

It is certified that error appears in the above-identified patent and that said Letters Patent is hereby corrected as shown below:

In column 16, line 27, in Claim 17, delete "the" and insert -- a --, therefor.

Signed and Sealed this

Twenty-seventh Day of May, 2008

JON W. DUDAS
*Director of the United States Patent and Trademark Office*